United States Patent Office 3,460,089
Patented Aug. 5, 1969

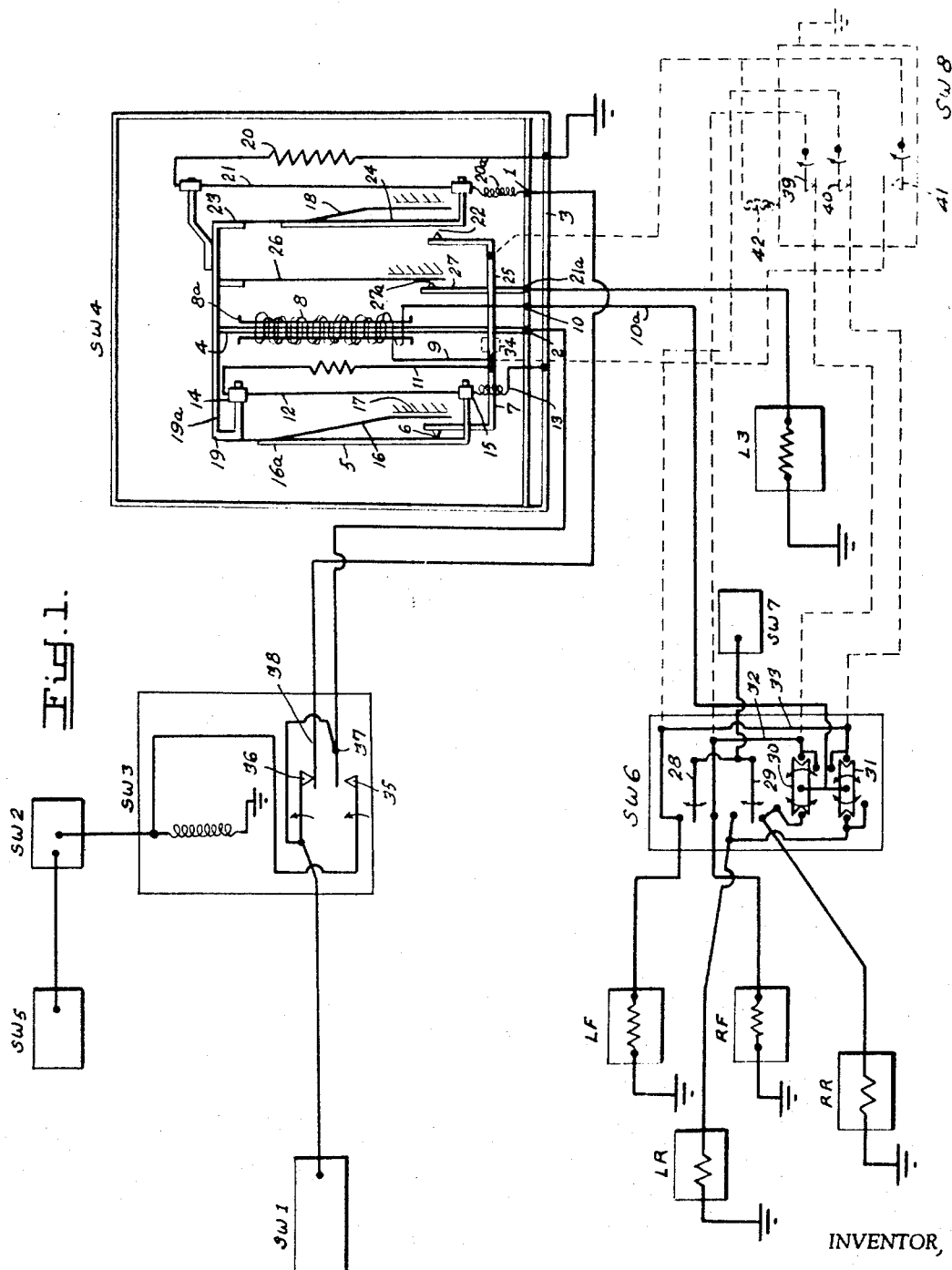

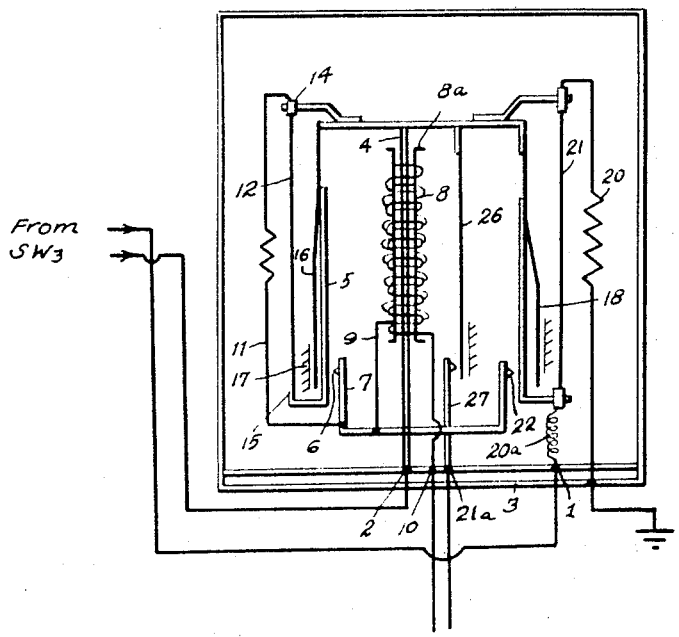
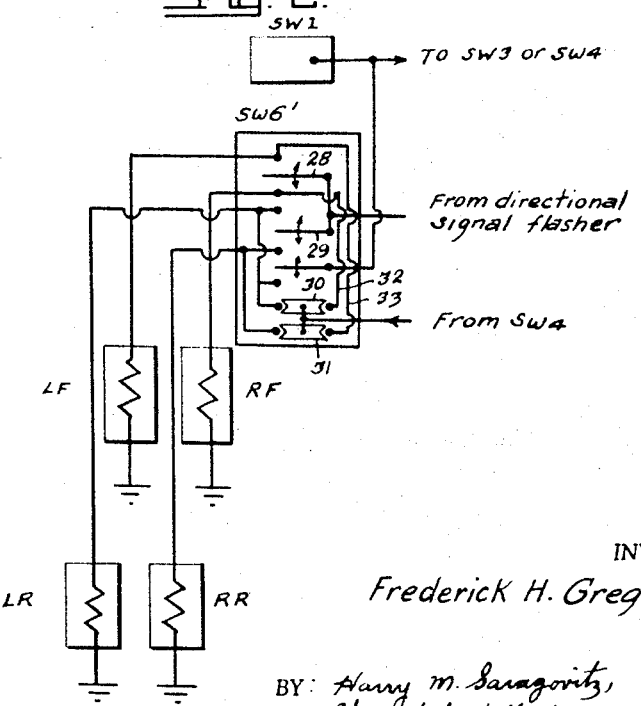

3,460,089
AUTOMOBILE SIGNAL-BRAKE LIGHT FLASHER
Frederick H. Gregory, R1, B 85, Oakington Manor,
Havre de Grace, Md. 21078
Filed Sept. 21, 1966, Ser. No. 581,113
Int. Cl. B60q 1/44
U.S. Cl. 340—67                                3 Claims

ABSTRACT OF THE DISCLOSURE

In order to make auto brake lights more effective as safety signals the present invention provides simple apparatus to flash the stop lights for a few seconds and then keep them on constantly until the brake pedal is released.

The invention described herein may be manufactured and used by or for the Government, for governmental purposes, without the payment to me of any royalty thereon.

The present invention relates to the increased effectiveness of automobile brake lights; and more particularly to a device which causes the brake lights to flash, upon the initial application of the brake pedal.

An increasing reliance upon high speed travel, combined with greater congestion on the highways, has resulted in a concomitant rise in vehicular collisions. Among the most frequently occurring of these encounters is the rear-end variety. Whether precipitated by poor visibility or by inattention, many of these tandem impacts could be avoided by a warning device on the rear end of the leading vehicle; something more than the usual increased brilliance of the rear lights afforded by depression of the brake pedal. One solution to the problem is to provide a means by which the rear end lights would flash a predetermined number of times upon incipient braking and then remain illuminated until release of the brake pedal. Additionally, the front parking lights could blink to attract the attention of approaching drivers. The prior art teaches sundry ways to accomplish these objectives, but none provide results as desirable as those obtainable with the present invention. In fact, many of the devices disclosed would increase highway dangers (for example, by failing to provide for cooperation between the flashing lights and directional signals), rather than mitigate existing deficiencies.

Accordingly, it is the primary object of the present invention to provide a means for initially flashing automobile brake lights upon brake pedal application. It is a further object to provide a means for flashing an automobile's front parking lights during the same period that the brake lights are flashing. It is another object to provide cooperation between the blinking brake lights and parking lights and the standard directional turn signals. It is still another object to provide a device to accomplish the above set forth objects even while the directional signals are in operation. It is a final object to provide a means for accomplishing the said flashing without relying upon the deceleration of the vehicle or upon the release of the throttle.

These and other objects and advantages of the present invention will be fully apparent from the following description taken in connection with the annexed drawing, in which:

FIGURE 1 is a circuit diagram of the present invention;
FIGURE 2 is a circuit diagram of a modification of one component—the directional signal lever—of the present invention; and
FIGURE 3 is a modification of the main constituting element of the present invention.

The device of the instant invention causes the standard rear brake lights of an automobile to operate in two modes. First, is the blink mode in which the lights flash on-off at a frequency of approximately two to four cycles per second. Although the duration of operation in this mode is adjustable, a period of approximately two seconds is suggested. Second, is the uninterrupted mode in which the lights are constantly illuminated as with existing devices.

Application of the vehicle foot brake closes brake light switch SW1, actuating the subject invention. Current flows through switch SW1, through relay SW3 to terminals 1, 2, which are attached to insulative terminal board 3. At terminal 2, current flows up the conducting coil center support 4, to bus bar 5 through normally closed contact 6; and to bus bar 7 through coil 8 (wrapped on core 8a) via conductor 9. The circuit is completed by conductor 10a leading from terminal 10 through switch SW6 to the vehicle lights (designated according to side and end location by LR, RR, LF, RF), and thence to ground. Current also flows from bus bar 7 through high resistance wires 11, 12 and 13 to ground. Wire 12, insulated at 14 and 15, is maintained under tension to promote closure of contact 6 and to flex leaf spring 16 against stop 17. Leaf spring 16 is mounted by soldering or some other adhesive process to bus bar 19a. Bus bar 5, in turn, is mounted on leaf spring 16 at 16a so that the lower end of bus bar 5 can rotate around point 19 where spring 16 is mounted on bus bar 19a to facilitate contact at 6.

When wire 12 warms, it expands permitting bus bar 5 to shift to the left under the expansive force of leaf spring 16 against stop 17, causing contact 6 to open. Without current coursing through it, wire 12 cools, contracts and closes contact 6 once more. In that manner the cycle is repeated. The frequency of the cycle can be adjusted by varying the value of the resistance in wires 11, 12, 13, the thickness of leaf spring 16, and the deformation of leaf spring 16 from its unstrained configuration.

When the brakes are actuated, current is also supplied through switch SW1 to terminal 1 causing resistors 20–21 to heat up. When resistive wire 21 heats up sufficiently, its expansion permits the rotation of bus bar 24 about point 23 and the consequent contact at 22. Hence, the value of resistance 21, 20, 20a, the gap width at 22, and the thickness of the leaf spring 18 can be adjusted to control the time of this operation. Those elements should be adjusted so that the operation occurs much more slowly—two to three seconds for the closure time—than the cyclical operation set forth above of the mechanism on the left of SW4. When contact 22 closes, current is supplied to the lights continuously via the route 2, 4, 23, 24, 25, 9, 8, 10 and SW6. After the brakes are released, wire 21 contracts, opening contact 22 once more.

Upon the closing of contact 6, current flows through coil 8 to the lights as set forth above. Element 26 consists of a ferromagnetic material in the form of a thin leaf spring. When current flows in coil 8, the spring 27a is attracted to the coil 8, closing the contact 27. Current then flows through 27 to an indicator light L3 which may be installed on the automobile instrument panel. The thickness of the leaf spring 26, the angle of its upper support, and the gap width at 27a can be adjusted such that contact is impossible if one light is burned out. In that case, a lesser amount of current flows through the coil, rendering the attraction of spring 26 to the coil 8 insufficient for contact. Failure of L3 to light up notifies the vehicle operator that a light has burned out or that some other malfunction has occurred.

The directional turn signal lever switch is represented by SW6. When the turn signal is actuated, for example, the left signal, the circuit from SW4 to the left signal lights LF, LR is opened. This is a common operation on existing automobiles which use one bulb for brake light and for turn signal. As indicated, the blades in SW6 rotate in the same direction when the lever is operated. The upper two blades 28, 29 rotate about their right ends and permit current to flow from the directional signal flasher SW7 to the appropriate signal lights. The lower two blades 30, 31 rotate about their centers and open the circuit between SW4 and the signal lights operated by SW7; the circuits to the lights on the other side of the vehicle remain closed. In this manner, the signals on one side of the vehicle flash for a turn signal while those on the other side flash at high frequency for a short interval to indicate braking. In the event that it should be desirable to eliminate the front braking signal, remove connectors 32 and 33.

Alternatively, it is desirable to operate the front signal lights in the blink mode only, a relay SW8 (shown in dotted lines) is necessary. A three pole signal throw relay with two contacts 39, 40 normally closed and one 41 normally open is suitable. Additionally, an insulator 34 is added to SW4 to break the circuit between 7 and 42. The coil 42 of the relay is connected between 25 and ground. The normally open leg 41 of the relay is connected between 25 and 9. And the two normally closed legs 39, 40 are connected as segments of wires 32 and 33, replacing the vertical sections of those wires. With such an arrangement, the circuit to the front signal lights is open when SW4 goes into the steady illumination mode—when contact 22 closes. The steady current flows from 24 to 22 through the normally open side of the relay to 9 and from there through coil 8 to SW6. From SW6 the current flows to both rear lights if the turn signal is not engaged. If the turn signal is engaged, then only the rear light not being flashed by SW7 is illuminated through SW4.

Switch SW3 is an optional device which permits the blink mode to continue indefinitely; for use when the vehicle is disabled or for some other reason located on the side of the highway in an emergency state. Containing a two pole single throw relay, one side of which is normally open and one side of which is normally closed, SW3 connects SW1 to 2 and 1 with its normally closed side. Switch SW2 is located on the automobile instrument panel. When SW2 and SW5—a switch connected to the parking brake or parking gear of the vehicle—are closed, the relay in SW3 is activated and contact 35 closes and 36 opens.

In that position, terminal 37 and contact 2 are connected to SW2, terminal 38 receiving no voltage due to 36 opening. In this manner, wire 21 does not get hot and contact 22 remains open. Switch SW5 prevents the vehicle operator from driving off with his signal lights flashing. A system without the indefinite flashing capability would have switch SW1 connected directly to contacts 1 and 2 in SW4, eliminating everything therebetween.

FIGURE 2 depicts a modification of SW6 of the present invention (all reference characters in FIG. 2 correspond to equivalent elements in FIG. 1) wherein the braking lights do not operate in the blinking mode when a turn signal is on. The blades 28, 29, 30, 31 in SW6¹ operate in gang fashion connecting the directional signal flasher to one set of turn signals, connecting SW1 to the opposite rear brake light, and opening all four lines from SW4 to the four lights LF, LR, RF and RR. When the directional signal lever is in the neutral position, SW4 is connected to all four lights; otherwise it is connected to none of the four lights. Again, if it is desired not to flash the front lights, wires 32 and 33 are removed.

If a split second delay can be tolerated between brake pedal depression and brake light illumination, then SW4 may be simplified as shown in FIG. 3 (all reference characters correspond to identical elements in FIG. 1). In that case, contact 6 is normally open instead of normally closed. With that exception, operation of the switch in FIG. 3 is essentially the same as that of SW4. Resistor 12 need no longer be insulated at its lower end 15. When contact 2 first receives voltage, the current must pass through resistors 12 and 11 to ground through the lights. After contact is made at 6, current flows through coil 8 and resistors 12 and 11 are automatically shorted such that 12 begins to cool and to contract. The cycle repeats as described above.

The circuitry described may be used to flash any combination of externally disposed lights such as side lights or clearance lights in addition to the internally disposed brake and directional signal lights. I wish it to be understood that I do not desire to be limited to the exact details of construction shown and described, for obvious modifications will occur to a person skilled in the art.

What is claimed is:

1. In an automobile light system, including a source of electric power, two rear lights mounted on opposite sides of said automobile, and two front lights mounted on opposite sides of said automobile; a device for flashing said lights comprising a switch operated by the vehicle brake, two cooperating electric circuits, a pair of thermal elements controlling the respective circuits, the first of said elements alternately opening and closing its associated circuit for a predetermined period of time to cause the flashing of said lights until the second of said elements closes its associated circuit to continuously illuminate said lights, a turn signal device arranged in series with said two named circuits comprising a directional signal flasher supplying power for said front and rear lights for turn indication, a manual signal selector lever, a pair of rotatable blades linked to said lever, a pair of contacts closable by said blades to complete the circuit from said signal flasher to the front and rear lights on one side of said automobile, a second pair of contacts alternately closable by said pair of blades to complete the circuit from said flasher to the front and rear lights on the other side of said automobile, a second pair of rotatable blades linked to said lever to rotate in unison with said first pair of blades, two pairs of contacts closable by said second pair of blades to complete the circuits from said two named circuits to the rear lights on the side of the automobile opposite to the side on which the lights are illuminated by the circuits completed by said first pair of blades, whereby the lights on one side of the automobile indicate a turn while those on the other side indicate braking action.

2. The device set forth in claim 1, wherein said second pair of blades complete the circuit from said two named circuits to the rear and to the front lights on the side of the automobile opposite to the side on which the lights are illuminated by the circuits completed by said first pair of blades.

3. The device set forth in claim 1, including an insulator between said two named circuits, a relay and a three-pole single-throw switch with two contacts normally closed and one contact normally open, said relay arranged with its coil connected between said second thermoelectric circuit and ground, and said switch arranged with its normally open leg bridging the gap between said two named circuits, and its normally closed legs connected as segments of the circuits between said second pair of blades and said front lights, whereby said front lights are flashed when said named circuit is closed and are inoperable when said second named circuit is closed.

(References on following page)

References Cited

UNITED STATES PATENTS

| | | | |
|---|---|---|---|
| 1,885,714 | 11/1932 | Hampton. | |
| 2,623,935 | 12/1952 | Young | 340—76 X |
| 2,639,345 | 5/1953 | Sitzer | 335—141 |
| 2,674,730 | 4/1954 | Klebanoff et al. | |
| 2,803,811 | 8/1957 | Turney | 340—251 X |
| 2,957,161 | 10/1960 | Daws | 340—72 X |
| 3,164,803 | 1/1965 | Leichsenring | 340—72 |
| 3,243,773 | 3/1966 | Leichsenring | 340—72 |
| 3,350,684 | 10/1967 | Turner | 340—71 |

FOREIGN PATENTS

| | | |
|---|---|---|
| 1,201,998 | 7/1959 | France. |
| 1,002,533 | 8/1965 | Great Britain. |

JOHN W. CALDWELL, Primary Examiner

KENNETH N. LEIMER, Assistant Examiner

U.S. Cl. X.R.

340—72, 80, 251